United States Patent
Kondo et al.

(10) Patent No.: US 6,535,494 B1
(45) Date of Patent: Mar. 18, 2003

(54) CDMA MOBILE TELECOMMUNICATION METHOD AND SYSTEM

(75) Inventors: Seiji Kondo, Saitama (JP); Yoshihisa Isoda, Yokohama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/262,826

(22) Filed: Mar. 5, 1999

(30) Foreign Application Priority Data

Mar. 6, 1998 (JP) .......................................... 10-073478

(51) Int. Cl.[7] ................................................. H04Q 7/20
(52) U.S. Cl. ...................... 370/335; 370/332; 455/442
(58) Field of Search .............................. 370/331, 332, 370/335; 375/130; 455/442, 524, 525, 515, 434, 428, 435, 445, 450, 451, 436–441, 443, 444

(56) References Cited

U.S. PATENT DOCUMENTS

| | | | | |
|---|---|---|---|---|
| 5,101,501 A | * | 3/1992 | Gilhousen et al. | 455/442 |
| 5,109,390 A | * | 4/1992 | Gilhousen et al. | 370/335 |
| 5,640,414 A | * | 6/1997 | Blakeney, II et al. | 375/130 |
| 6,021,122 A | * | 2/2000 | Tiedemann, Jr. | 370/331 |
| 6,178,164 B1 | * | 1/2001 | Wang et al. | 370/331 |
| 6,216,004 B1 | * | 4/2001 | Tiedemann, Jr. et al. | 455/442 |
| 2001/0023185 A1 | * | 9/2001 | Hakkinen et al. | 455/434 |

FOREIGN PATENT DOCUMENTS

| | | |
|---|---|---|
| EP | WO 95/08897 | 3/1995 |
| JP | 7-298334 | 11/1995 |
| JP | 8-65201 | 3/1996 |
| JP | 9-74378 | 3/1997 |
| JP | 9-83424 | 3/1997 |
| JP | 9-505948 | 6/1997 |
| JP | 9-507115 | 7/1997 |
| WO | WO 95/20865 | 8/1995 |
| WO | WO 97/47154 | 12/1997 |

OTHER PUBLICATIONS

Korean Office Action dated Apr. 30, 2001, with partial English translation.
European Search Report dated Jun. 14, 1999.

* cited by examiner

*Primary Examiner*—Tracy Legree
(74) *Attorney, Agent, or Firm*—McGinn & Gibb, PLLC

(57) ABSTRACT

A code division multiple access (CDMA) mobile telecommunication system and method includes a plurality of radio base stations disposed under a base control station. A control channel signal and a traffic channel signal from the base control station are communicated between the radio base stations and a mobile station. The method includes transmitting, when a call is to be connected, an origination/page response signal to a particular one of the radio base stations exhibiting the highest signal strength, transmitting control channel information of the particular radio base station from the base control station to a radio base station of the adjacent cell, starting communication of the control channel by the radio base station of the adjacent cell using control channel information transmitting the descending control channel signal from the base control station to the particular radio base station and the adjacent radio base station, transmitting the ascending control channel signal with a signal quality of the received ascending control channel signal added to the base control station, and selecting one of the ascending control channel signals received through the particular radio base station and the radio base station of the adjacent cell based on the signal qualities of the ascending control channel signals.

8 Claims, 2 Drawing Sheets

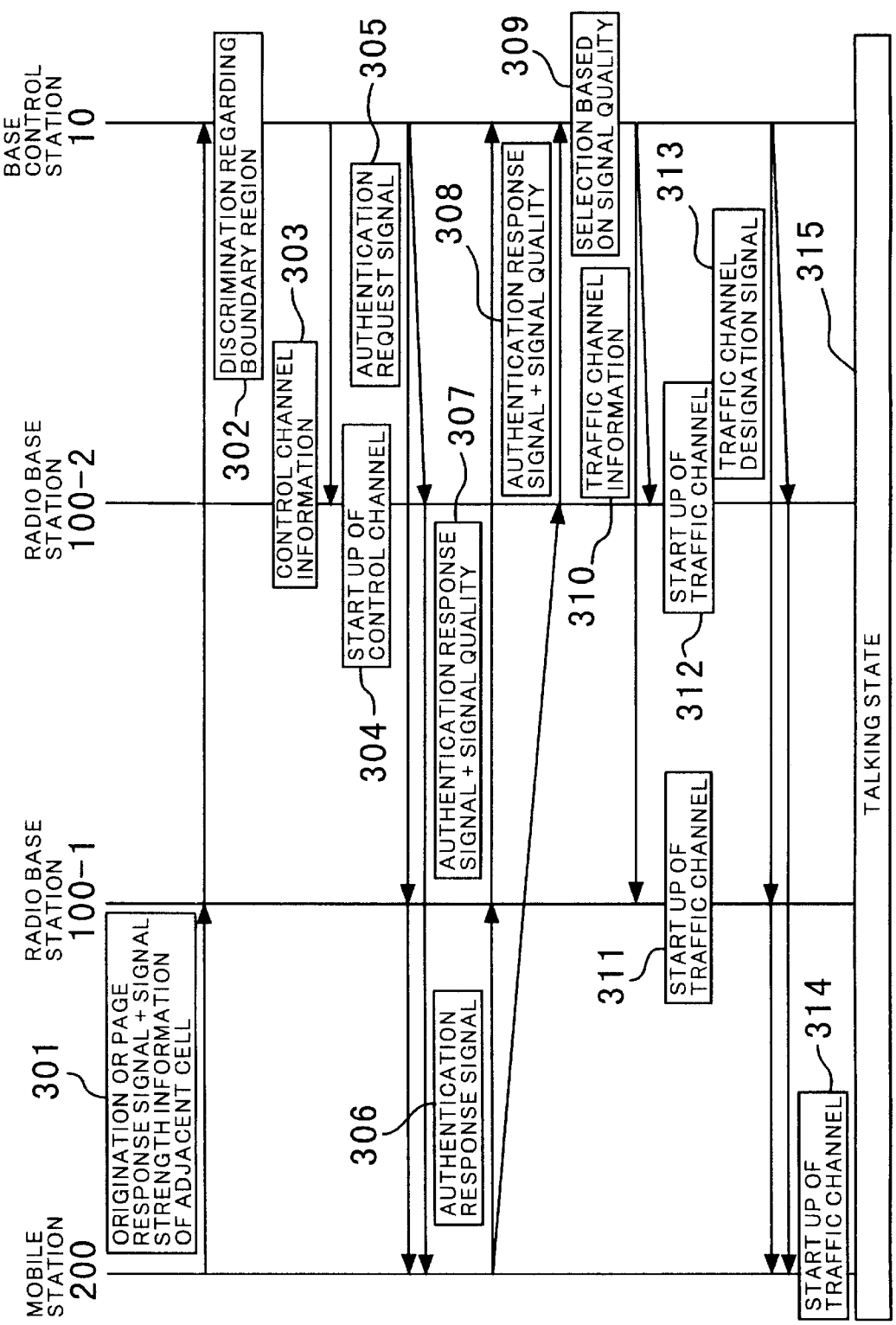

CDMA MOBILE TELECOMMUNICATION METHOD AND SYSTEM

BACKGROUND OF THE INVENTION

1. Field of the Invention

This invention relates to a CDMA (Code Division Multiple Access) mobile telecommunication method and system, and more particularly to a hand-over method on a control channel in a CDMA mobile telecommunication method and system.

2. Description of the Related Art

As a publication relating to the technical field to which the present invention belongs, TIA (Telecommunications Industry Association), EIA (Electronic Industries Association), IS-95-A, published May, 1995 and so forth are referred to.

Various multiple access systems are adopted for a mobile telecommunication system such as a cellular system. A code division multiple access (CDMA) mobile telecommunication system which is one of the multiple access systems is a system wherein, in order to identify an area called cell covered by each radio base station, a unique spread code is allocated to each radio base station and a same carrier frequency is used in all areas.

In the CDMA mobile telecommunication system, a mobile station first searches cell identification signals transmitted from radio base stations and selects one of the radio base stations which exhibits the highest signal strength.

Then, in order for the mobile station to talk, it communicates control channel signals such as an origination signal or a page response signal using a control channel of the selected radio base station. Then, after the base control station confirms that the mobile station can enjoy a service by the self system, it allocates a traffic channel for talking to allow the mobile station to enter a conversation condition.

The conventional system described above, however, has a problem in that, when a mobile station is present in a boundary region of an adjacent cell, a channel used for transmission by the adjacent cell (for example, a pilot channel by which a cell identification signal is transmitted, a control channel or a traffic channel) so interferes with communication of the mobile station that the mobile station cannot receive a control channel signal of the cell in which the mobile station is present or a traffic channel signal immediately after a traffic channel is allocated.

SUMMARY OF THE INVENTION

It is an object of the present invention to provide a CDMA mobile telecommunication method and system which provides augmented ratios of reception of a control channel used between a mobile station present in a boundary region of an adjacent cell and a radio base station and a traffic channel signal immediately after use of a traffic channel is started to raise the call connection completion ratio.

In order to attain the object described above, according to an aspect of the present invention, there is provided a CDMA mobile telecommunication method for a CDMA mobile telecommunication system wherein a plurality of radio base stations are disposed under one base control station and a control channel signal and a traffic channel signal from the base control station are communicated between the radio base stations and a mobile station, comprising the steps of transmitting, when a call is to be connected, an origination signal or a page response signal to which signal strength information of an adjacent cell is added from the mobile station to a particular one of the radio base stations which exhibits the highest signal strength, transmitting, when the base control station receives the origination signal or page response signal from the mobile station through the particular radio base station, control channel information used by the particular radio base station from the base control station to a radio base station of the adjacent cell if the base control station discriminates from the signal strength information of the adjacent cell included in the origination signal or page response signal that the mobile station is present in a boundary region of the adjacent cell, starting, when the radio base station of the adjacent cell receives the control channel information from the base control station, communication of the control channel by the radio base station of the adjacent cell in accordance with the control channel information, transmitting, when the base control station is to transmit a descending control channel signal to the mobile station, the descending control channel signal from the base control station to the particular radio base station and the adjacent radio base station, transmitting, when each of the particular radio base station and the radio base station of the adjacent cell receives an ascending control channel signal from the mobile station, the ascending control channel signal with a signal quality of the received ascending control channel signal added to the ascending control channel signal from the radio base station and the radio base station of the adjacent cell to the base control station, and selecting, by the base control station, one of the ascending control channel signals received through the particular radio base station and the radio base station of the adjacent cell based on the signal qualities of the ascending control channel signals.

When the base control station is to designate a traffic channel for said mobile station which is communicating the control channel signal with the particular radio base station and the radio base station of the adjacent cell, the base control station may cause the particular radio base station and the radio base station of the adjacent cell to start up a traffic channel so that traffic channel designation signals of the particular radio base station and the radio base station of the adjacent cell are transmitted to the mobile station.

According to another aspect of the present invention, there is provided a CDMA mobile telecommunication system wherein a plurality of radio base stations are disposed under one base control station and a control channel signal and a traffic channel signal from the base control station are communicated between the radio base stations and a mobile station, comprising means provided on the base control station for discriminating, when an origination signal or a page response signal from the mobile station is received through a particular one of the radio base stations, from signal strength information of an adjacent cell included in the origination signal or page response signal, whether or not the mobile station is present in a boundary region of the adjacent cell and transmitting, if the base control station discriminates that the mobile station is present in the boundary region of the adjacent cell, control channel information used by the particular radio base station to a radio base station of the adjacent cell, means provided on the radio base station of the adjacent cell for starting, when the control channel information is received from the base control station, communication by a control channel in accordance with the control channel information, means provided on the base control station for transmitting, when the base control station is to transmit a descending control channel signal to the mobile station, the descending control channel signal to the particular radio base station and the adjacent radio base station, means provided on each of the particular radio base station and the radio base station of the adjacent cell for transmitting, when an ascending control channel signal from the mobile, station is received, the ascending control channel signal with a signal quality of the ascending control channel signal added to the ascending control channel signal to the base control station, and means provided on the base control station for selecting one of the ascending control channel signals received from the particular radio base station and the radio base station of the adjacent cell based on the signal qualities of the received ascending control channel signals.

With the CDMA mobile telecommunication method and the CDMA mobile telecommunication system, the mobile station present in the boundary region of the adjacent cell is put into a soft hand-off state on the control channel, and a conversation condition is entered while the state is kept. Consequently, even if interference from the adjacent cell occurs, the call connection completion ratio of the mobile station can be enhanced without deterioration of the reception ratios of a control channel signal and a traffic channel signal immediately after use of the traffic channel is started.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a flow diagram illustrating a sequence of operations of the CDMA mobile telecommunication system shown in FIG. 1.

DESCRIPTION OF THE PREFERRED EMBODIMENT

Figure 1:
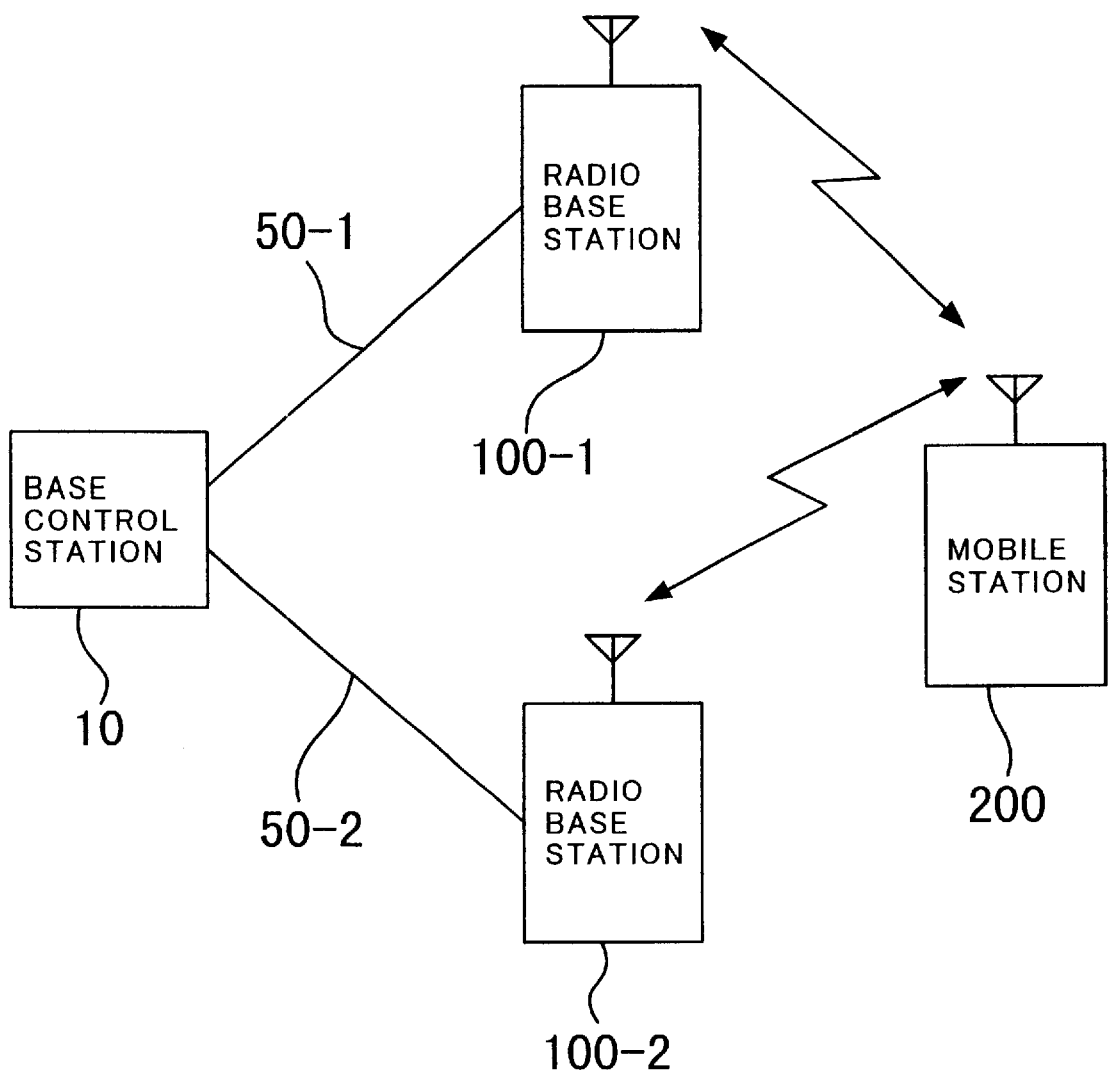
FIG. 1 is a diagrammatic view schematically showing a construction of a CDMA mobile telecommunication system to which the present invention is applied.

A CDMA mobile telecommunication method according to the present invention is applied to a CDMA mobile telecommunication system wherein a plurality of radio base stations (100-1 and 100-2 of FIGS. 1 and 2) are disposed under one base control station (10 of FIGS. 1 and 2) and a control channel signal and a traffic channel signal from the base control station are communicated between the radio base stations and a mobile station (200 of FIGS. 1 and 2). The CDMA mobile telecommunication method comprises the steps of transmitting, when a call is to be connected, an origination signal or page response signal (301 of FIG. 2) to which signal strength information of an adjacent cell is added from the mobile station (200 of FIG. 2) to a particular one (100-1 of FIG. 2) of the radio base stations which exhibits the highest signal strength, transmitting, when the base control station receives the origination signal or page response signal from the mobile station through the particular radio base station, control channel information (303 of FIG. 2) used by the particular radio base station from the base control station (10 of FIG. 2) to a radio base station (100-2 of FIG. 2) of the adjacent cell if the base control station discriminates from the signal strength information of the adjacent cell included in the origination signal or page response signal that the mobile station is present in a boundary region of the adjacent cell, starting (304 of FIG. 2), when the radio base station (100-2 of FIG. 2) of the adjacent cell receives the control channel information (303 of FIG. 2) from the base control station (100 of FIG. 2), communication of the control channel by the radio base station of the adjacent cell in accordance with the control channel information, transmitting (305 of FIG. 2), when the base control station (10 of FIG. 2) is to transmit a descending control channel signal to the mobile station (10 of FIG. 2), the descending control channel signal from the base control station to the particular radio base station and the adjacent radio base station (100-2 of FIG. 2), transmitting, when each of the particular radio base station (100-1 of FIG. 2) and the radio base station (100-2 of FIG. 2) of the adjacent cell receives an ascending control channel signal from the mobile station (200 of FIG. 2), the ascending control channel signal with a signal quality (307, 308 of FIG. 2) of the received ascending control channel signal added to the ascending control channel signal from the radio base station and the radio base station of the adjacent cell to the base control station (10 of FIG. 2), and selecting, by the base control station (10 of FIG. 2), one of the ascending control channel signals received through the particular radio base station (100-1 of FIG. 2) and the radio base station (100-2 of FIG. 2) of the adjacent cell based on the signal qualities of the ascending control channel signals.

When the base control station (10 of FIG. 2) is to designate a traffic channel for the mobile station (200 of FIG. 2) which is communicating the control channel signal with the particular radio base station (100-1 of FIG. 2) and the radio base station (100-2 of FIG. 2) of the adjacent cell, the base control station (10 of FIG. 2) causes the particular radio base station (100-1 of FIG. 2) and the radio base station (100-2 of FIG. 2) of the adjacent cell to start up a traffic channel (311, 312 of FIG. 2) so that traffic channel designation signals (313 of FIG. 2) of the particular radio base station and the radio base station of the adjacent cell are transmitted to the mobile station (200 of FIG. 2). Upon reception of the traffic channel designation signals, the mobile station (200 of FIG. 2) starts up a traffic channel (314 of FIG. 2).

The CDMA mobile telecommunication method and the CDMA mobile telecommunication system described above are described in more detail with reference to drawings.

Referring to FIG. 1, there is shown a system construction of a simple form of a CDMA mobile telecommunication system to which the present invention is applied. The CDMA mobile telecommunication system shown includes an base control station 10 which performs call processing control, radio/wire line control and subscriber management, and radio base stations 100-1 and 100-2 which perform radio transmission/reception of a control channel signal and a traffic channel signal to and from a mobile station 200 and repeat the control channel signal or traffic channel signal to the base control station 10 over sound and control lines 50-1 and 50-2, respectively.

Referring also to FIG. 2 which illustrates an operation sequence of CDMA mobile telecommunication system shown in FIG. 1, the mobile station 200 searches cell identification signals transmitted from radio base stations, successively stores a plurality of radio base stations which exhibit comparatively high signal strengths, and produces adjacent cell signal strength information based on the stored radio base stations.

Then, the mobile station 200 selects one of the radio base stations which exhibits the highest signal strength. Here, it is assumed that the mobile station 200 selects the radio base station 100-1.

In order to establish a call connection, the mobile station 200 produces an origination signal or page response signal 301 to which the adjacent cell signal strength information is added and transmits it to the radio base station 100-1. The radio base station 100-1 receives the origination signal or page response signal 301 and repeats it to the base control station 10.

The base control station 10 calculates, from the adjacent cell signal strength information of the origination signal or page response signal 301 which includes the adjacent cell signal strength information, a difference in signal strength from the other radio base station 100-2 and discriminates, if the difference is smaller than a predetermined threshold value, that the mobile station 200 is in a boundary region of the adjacent cell (302). Then, the base control station 10 transmits, to the radio base station 100-2 of the adjacent cell, control channel information (for example, a spread code for identification of the cell) 303 used by the radio base station 100-1.

The radio base station 100-2 of the adjacent cell receives the control channel information 303 and, allocates and starts up a free channel as a control channel according to the control channel information 303 (304).

Consequently, the mobile station 200 and the radio base station 100-1 and radio base station 100-2 enter a soft hand-off state on the control channel. The soft hand-off state signifies a state wherein control channel signals or traffic channel signals transmitted from two or more different radio base stations are received by a mobile station. Alternatively, it signifies a state wherein a control channel signal or a sound signal from a mobile station is received by two or more radio base stations.

Then, in order to confirm that the mobile station 200 can enjoy a service by the present system, the base control station 10 transmits an authentication request signal 305 to the mobile station 200 through the radio base station 100-1 and also through the radio base station 100-2 of the adjacent cell.

The mobile station 200 receives the same authentication request signals 305 from the radio base station 100-1 and the radio base station 100-2 of the adjacent cell, and consequently can compose them to enhance the reception ratio.

The mobile station 200 receives the authentication request signal 305 and transmits an authentication response signal 306.

The authentication response signal 306 is received by both of the radio base station 100-1 and the radio base station 100-2 of the adjacent cell. The radio base station 100-1 and the radio base station 100-2 receive the authentication response signal 306 and individually add signal quality information (for example, a frame error rate (FER), a bit error rate (BER), a symbol error rate (SER) or the like) thereof to the authentication response signal 306 and transmit authentication response signals 307 and 308 to the base control station 10, respectively.

The base control station 10 selects, based on the signal quality information of the authentication response signals 307 and 308 which include the signal quality information, one of the authentication response signals which exhibits a higher quality (309), and compares a result of the authentication. If the result of the authentication is affirmative, then in order to allocate a traffic channel to the mobile station 200, the base control station 10 transmits traffic channel information 310 which includes a spread code and so forth to be used in the traffic channel to both of the radio base station 100-1 and the radio base station 100-2 with which the base control station 10 is already communicating in a soft-hand off state on the control channel.

The radio base station 100-1 and the radio base station 100-2 receive the traffic channel information 310 from the base control station 10 and individually start up a traffic channel in accordance with the received traffic channel information (311 and 312).

The base control station 10 transmits, in order to cause the mobile station 200 to switchably use the traffic channel, a traffic channel designation signal 313 to both of the radio base station 100-1 and the radio base station 100-2. The mobile station 200 receives the traffic channel designation signal 313 through the radio base station 100-1 and the radio base station 100-2 and starts up the traffic channel (314).

Consequently, the mobile station 200 enters a soft hand-off state on the control channel and changes its used channel to the traffic channel while it remains in the soft hand-off state. Consequently, the mobile station 200 enters a talking state (315).

While the foregoing embodiment is described taking a case where it includes two radio base stations as an example, there is no trouble even if three or more radio base stations are involved, and the present invention can be applied even where a radio base station is divided into sectors.

While a preferred embodiment of the present invention has been described using specific terms, such description is for illustrative purpose only, and it is to be understood that changes and variations may be made without departing from the spirit or scope of the following claims.

What is claimed is:

1. A code division multiple access (CDMA) mobile telecommunication method for a CDMA mobile telecommunication system wherein a plurality of radio base stations are disposed under one base control station and a control channel signal and a traffic channel signal from said base control station are communicated between said radio base stations and a mobile station, comprising:

transmitting, when a call is to be connected, an origination signal or a page response signal to which signal strength information of an adjacent cell is added from said mobile station to a particular one of said radio base stations which exhibits the highest signal strength;

transmitting, when said base control station receives the origination signal or page response signal from said mobile station through the particular radio base station, control channel information used by the particular radio base station from said base control station to a radio base station of the adjacent cell if said base control station discriminates from the signal strength information of the adjacent cell included in the origination signal or page response signal that said mobile station is present in a boundary region of the adjacent cell;

starting, when the radio base station of the adjacent cell receives the control channel information from said base control station, communication of the control channel by the radio base station of the adjacent cell in accordance with the control channel information;

transmitting, when said base control station is to transmit a descending control channel signal to said mobile station, the descending control channel signal from said base control station to the particular radio base station and the adjacent radio base station;

transmitting, when each of the particular radio base station and the radio base station of the adjacent cell receives an ascending control channel signal from said mobile station, the ascending control channel signal with a signal quality of the received ascending control channel signal added to the ascending control channel signal from the radio base station and the radio base station of the adjacent cell to said base control station;

selecting, by said base control station, one of the ascending control channel signals received through the particular radio base station and the radio base station of the adjacent cell based on the signal qualities of the ascending control channel signals, and wherein said mobile station, said particular radio base station, and said radio base station of the adjacent cell enter a soft hand-off state on a control channel selected by said base control station, said particular radio base station and said radio base station of the adjacent cell starting up a traffic channel for voice communication by said mobile station while in said soft hand-off state.

2. The CDMA mobile telecommunication method of claim 1, wherein, when said base control station is to designate a traffic channel for said mobile station which is communicating the control channel signal with the particular radio base station and the radio base station of the adjacent cell, said base control station causes the particular radio base station and the radio base station of the adjacent cell to start up a traffic channel so that traffic channel designation signals of the particular radio base station and the radio base station of the adjacent cell are transmitted to said mobile station.

3. A code division multiple access (CDMA) mobile telecommunication system wherein a plurality of radio base stations are disposed under one base control station and a control channel signal and a traffic channel signal from said base control station are communicated between said radio base stations and a mobile station, comprising:

means provided on said base control station for discriminating, when an origination signal or a page response signal from said mobile station is received through a particular one of said radio base stations, from signal strength information of an adjacent cell included in the origination signal or page response signal, whether or not said mobile station is present in a boundary region of the adjacent cell and transmitting, if said base control station discriminates that said mobile station is present in the boundary region of the adjacent cell, control channel information used by the particular radio base station to a radio base station of the adjacent cell;

means provided on the radio base station of the adjacent cell for starting, when the control channel information is received from said base control station, communication by a control channel in accordance with the control channel information;

means provided on said base control station for transmitting, when said base control station is to transmit a descending control channel signal to said mobile station, the descending control channel signal to the particular radio base station and the adjacent radio base station;

means provided on each of the particular radio base station and the radio base station of the adjacent cell for transmitting, when an ascending control channel signal from said mobile station is received, the ascending control channel signal with a signal quality of the ascending control channel signal added to the ascending control channel signal to said base control station;

means provided on said base control station for selecting one of the ascending control channel signals received from the particular radio base station and the radio base station of the adjacent cell based on the signal qualities of the received ascending control channel signals, and wherein said mobile station, said particular radio base station, and said radio base station of the adjacent cell enter a soft hand-off state on a control channel selected by said base control station, said particular radio base station and said radio base station of the adjacent cell starting up a traffic channel for voice communication by said mobile station while in said soft hand-off state.

4. The CDMA mobile telecommunication method of claim 1, wherein said control channel information comprises a spread code for identification of a cell.

5. A code division multiple access (CDMA) mobile telecommunication method for a communication system including a plurality of radio base stations controlled by a base control station, and communicating with a mobile station, said method comprising:

transmitting an origination signal or page response signal including an adjacent cell signal strength information from said mobile station to a base control station via at least a first one of said plurality of radio base stations;

calculating at said base control station a difference in a signal strength of a signal of said first one of said plurality of radio base stations and a signal of at least a second one of said plurality of radio base stations;

discriminating at said base control station, using said difference in signal strength, whether said mobile station is at a boundary region of an adjacent cell;

transmitting from said base control station, when said mobile station is determined to be at a boundary region of said adjacent cell, control channel information of said first one of said plurality of radio base stations to at least said second one of said plurality of radio base stations;

establishing a free channel as a control channel at a radio base station of said adjacent cell using said control channel information of said first one of said plurality of radio base stations; and receiving at said mobile station said control channel information of said first one of said plurality of radio base stations from at least one of said plurality of radio base stations.

6. The CDMA mobile telecommunication method of claim 5, further comprising:

receiving at said mobile station, subsequent to receiving said control channel information, an authentication request signal transmitted by said base control station through said first one of said plurality of radio base stations and said radio base station of said adjacent cell;

transmitting an authentication response signal from said mobile station to said radio control station via said first one of said plurality of radio base stations and said radio base station of said adjacent cell, said first one of said plurality of radio base stations and said radio base station of said adjacent cell individually adding signal quality information;

selecting at said base control station, based on the signal quality information of said authentication response signal, one of said transmitted authentication response signals;

transmitting traffic channel information from said base control station to said plurality of radio base stations communicating on the control channel, said plurality of radio base stations starting up a traffic channel in accordance with the received traffic channel information;

receiving at said mobile station a traffic channel designation signal transmitted by said base control station via said plurality of radio base stations, said mobile station changing a communication channel to a designated traffic channel while maintaining a soft hand-off state on a control channel; and initiating a voice communication transmission from said mobile station.

7. The CDMA mobile telecommunication method claimed in claim 5, wherein at least one of said plurality of radio base stations is a radio base station of an adjacent cell.

8. The CDMA mobile telecommunication method claimed in claim 6, wherein said signal quality information includes at least one of frame error rate, bit error rate, and symbol error rate.

* * * * *